US012294161B2

(12) United States Patent
de Rijk et al.

(10) Patent No.: US 12,294,161 B2
(45) Date of Patent: May 6, 2025

(54) ARRANGEMENT OF A WAVEGUIDE ASSEMBLY AND ITS MANUFACTURING PROCESS

(71) Applicant: SWISSto12 SA, Renens (CH)

(72) Inventors: Emile de Rijk, Grand-Saconnex (CH); Mathieu Billod, Présilly (FR); Esteban Menargues Gomez, Préverenges (CH); Santiago Capdevila Cascante, Renens (CH); Tomislav Debogovic, Chexbres (CH); Alexandre Dimitriades, Nyon (CH); Lionel Simon, Lausanne (CH); Arnaud Boland, Chavanne-des-Bois (CH)

(73) Assignee: SWISSto12 SA, Renens (CH)

( * ) Notice: Subject to any disclaimer, the term of this patent is extended or adjusted under 35 U.S.C. 154(b) by 388 days.

(21) Appl. No.: 17/601,554

(22) PCT Filed: Apr. 9, 2020

(86) PCT No.: PCT/IB2020/053399
§ 371 (c)(1),
(2) Date: Oct. 5, 2021

(87) PCT Pub. No.: WO2020/208574
PCT Pub. Date: Oct. 15, 2020

(65) Prior Publication Data

US 2022/0181778 A1 Jun. 9, 2022

(30) Foreign Application Priority Data

Apr. 9, 2019 (FR) ...................................... 1903810

(51) Int. Cl.
*H01Q 5/55* (2015.01)
*H01P 5/12* (2006.01)
(Continued)

(52) U.S. Cl.
CPC ............ *H01Q 5/55* (2015.01); *H01P 11/002* (2013.01); *H01Q 1/288* (2013.01); *H01P 5/12* (2013.01)

(58) Field of Classification Search
CPC ........ H01Q 5/55; H01Q 1/288; H01P 11/002; H01P 5/12; H01P 1/042; H01P 3/12;
(Continued)

(56) References Cited

U.S. PATENT DOCUMENTS

| | | | | |
|---|---|---|---|---|
| 2014/0071010 A1* | 3/2014 | Pouyez | H01Q 13/02 343/779 |
| 2018/0301800 A1 | 10/2018 | Wu et al. | |

(Continued)

FOREIGN PATENT DOCUMENTS

| | | |
|---|---|---|
| EP | 3208200 A1 | 8/2017 |
| EP | 3439099 A1 | 2/2019 |

(Continued)

OTHER PUBLICATIONS

International Search Report for PCT/IB2020/053399 dated Sep. 8, 2020.

(Continued)

*Primary Examiner* — Lincoln D Donovan
*Assistant Examiner* — Tyler J Pereny
(74) *Attorney, Agent, or Firm* — McDonald Hopkins LLC

(57) ABSTRACT

An arrangement for communication satellites including a payload bay. The arrangement includes an assembly of waveguides, waveguide fixation interfaces for fixing the waveguides to electronic equipment and/or components and a mechanical structure including a plurality of links interconnecting at least some of the waveguides to ensure the stability of the waveguide assembly. The arrangement further includes at least one heat pipe that is arranged to heat or cool one or more of the waveguides. The arrangement is formed in a single piece by 3D printing.

15 Claims, 6 Drawing Sheets

(51) Int. Cl.
*H01P 11/00* (2006.01)
*H01Q 1/28* (2006.01)

(58) Field of Classification Search
CPC ........... H01P 1/122; H01P 3/00; H03K 17/56; H03K 5/0217; H04L 49/25
See application file for complete search history.

(56) References Cited

U.S. PATENT DOCUMENTS

| | | | |
|---|---|---|---|
| 2018/0358681 A1 | 12/2018 | Bosshard et al. | |
| 2019/0020117 A1* | 1/2019 | Cohen | H01Q 1/36 |
| 2019/0036193 A1* | 1/2019 | Fluitt | H05K 7/2039 |
| 2022/0190456 A1* | 6/2022 | Hollenbeck | H01P 3/12 |

FOREIGN PATENT DOCUMENTS

| | | |
|---|---|---|
| GB | 2548400 A | 9/2017 |
| WO | 2018/029455 A1 | 2/2018 |

OTHER PUBLICATIONS

Written Opinion for PCT/IB2020/053399 dated Sep. 8, 2020.
Office Action issued in corresponding European Patent Application No. 20717976.3; Dated: Feb. 2, 2024.

* cited by examiner

ARRANGEMENT OF A WAVEGUIDE ASSEMBLY AND ITS MANUFACTURING PROCESS

TECHNICAL FIELD

The present invention relates to an arrangement for telecommunication satellites, comprising an assembly of waveguides for radio frequency signals. The present invention also relates to a method of designing and manufacturing this arrangement.

STATE OF THE ART

Waveguides are widely used in telecommunication satellites, notably to interconnect electronic components and equipment.

Conventional systems contain a large number of electronic components and equipment and therefore require a large number of waveguides, which are typically interconnected by assembling standard length elements, such as straight or curved tubes, with flanges screwed together to connect these electronic components and equipment.

The use of waveguides made with standardized tubes imposes sub-optimal paths and complex interconnection layouts. This implies the use of long waveguides which have the disadvantages of degrading or attenuating signals transmitted in these guides and increasing the weight and footprint of the system.

Furthermore, the fixation of waveguides in the payload bay of a communication satellite requires stands or fixation systems screwed on the waveguides, which implies additional weight and complicates the assembly of conventional systems.

In order to ensure the necessary rigidity and stability of the waveguides to withstand the important mechanical constraints, in particular during the take-off of the rocket carrying the telecommunications satellite, it is known to oversize the waveguides so that they have a significant thickness and to fix them in the payload bay thanks to numerous fixing stands.

Furthermore, in order to ensure that the waveguides and the electronic components and equipment operate in an optimal temperature range, it is necessary to integrate fins, radiators, dissipation elements, heat dissipation pipes, etc. into the conventional systems, which makes the assembly even more complex.

This can make the design of the system particularly complex to ensure that all waveguides and electronic components and equipment required by the system can be arranged within a predetermined footprint.

Conventional manufacturing processes impose constraints on the freedom of the designer of the system because complex waveguides have tight mechanical tolerances in order to achieve the desired RF performance. Therefore, care must be taken to ensure that waveguides can be constructed to achieve this performance.

Conventionally, waveguides are designed, manufactured and supplied individually, and are manually assembled into a waveguide assembly using fixation tools. This approach allows optimizing the design of each waveguide based on its performance and the transmission characteristics presented to the RF signals passing through that waveguide. However, this implies significant assembly costs and completion times.

As system requirements evolve, requiring an increasingly complex design, due to the need for increased signal bandwidth and improved performance, the spatial and weight constraints for accommodating waveguides become increasingly important.

Conventional means of reducing the size and manufacturing time associated with waveguides include simplifying waveguide assembly, by reducing the size, length, and/or diameter of the waveguides. It is also possible to design more complex signal processing layouts so that information can be multiplexed onto a smaller number of signals, requiring fewer waveguides, for example, but at the expense of increasing the processing load of a demultiplexer.

WO2018029455 discloses a waveguide assembly constructed such that two or more, and in some cases all, of the waveguides in the assembly are integrally formed with one another. In the case of using waveguide connectors to enable interfacing with other waveguide assemblies, the waveguides of the assembly and one or more interface flanges of one or more respective waveguide connectors may be integrally formed. Such integral formation may be achieved using an additive manufacturing (AM) technique.

EP3439099 discloses a spacecraft comprising a power network that includes a plurality of unit modules. Each module includes a plurality of radio frequency (RF) waveguides structurally coupled together with at least one connecting element. For each unit module, the connection element and a wall structure defining the plurality of waveguides are co-fabricated using an additive manufacturing process. The power supply array may also include a cooling system such as a radiator The power supply array according to EP3439099 is not, however, suitable for heating elements that might be arranged in locations in or outside the spacecraft's payload bay to ensure optimal operation of such elements.

The present invention therefore aims at providing an arrangement of a waveguide assembly, for telecommunication satellites, optimized according to the complexity of the arrangement, the spatial and weight constraints and which addresses the drawbacks of the prior art.

Another aim of the present invention is to provide an arrangement of a waveguide assembly optimized as a function of the number and type of electronic equipment and/or components to be integrated according to the constraints of a predetermined specification of a designer.

Another aim of the present invention is to provide an arrangement of a waveguide assembly that is easy to design and fast to manufacture.

Another aim of the present invention is to provide an arrangement of a waveguide assembly to which electronic components and/or equipment can be easily connected.

BRIEF SUMMARY OF THE INVENTION

These aims are achieved by a satellite arrangement comprising a payload bay. The arrangement includes an assembly of waveguides, waveguide fixation interfaces for fixing the waveguides to electronic equipment and/or components, and a mechanical structure including a plurality of links interconnecting at least some of the waveguides to provide stability to the waveguide assembly. The arrangement further comprises at least one heat pipe that is arranged to heat or cool one or more of the waveguides. The arrangement is formed in one piece by 3D printing.

According to an embodiment, the mechanical structure connects the heat pipe to at least one waveguide.

According to an embodiment, the one-piece arrangement further comprises at least one antenna.

According to an embodiment, the antenna comprises an array of multiple RF feed chains incorporating a heat exchanger. The antenna is monolithic and further comprises a housing containing at least a portion of the array and comprising at least one inlet and one outlet in fluid communication with the heat exchanger.

According to an embodiment, the mechanical structure comprises a multitude of rigid links interconnecting the lateral surfaces of at least two waveguides at different points.

According to an embodiment, the arrangement further comprises fixation elements for fixing the arrangement to the payload bay or to a support connected to the payload bay.

According to an embodiment, the arrangement further comprises one or more filters.

Another aspect of the invention relates to a satellite assembly, comprising the arrangement described above and electronic equipment and/or components connected to the waveguide fixation interfaces.

According to an embodiment, one or more electronic equipment and/or components are selected from the group consisting of the following: switch, circulator, isolator, low noise amplifier, power amplifier, computer signal processing unit, RF load, filter, multiplexer, MMIC circuit and RF circuit.

According to an embodiment, the assembly further comprises photovoltaic cell panels that are connected to the mechanical structure.

Another aspect of the invention relates to a satellite arrangement comprising a payload bay. The arrangement comprises a waveguide assembly, waveguide fixation interfaces for fixing the waveguides to electronic equipment and/or components, and a mechanical structure comprising a plurality of links interconnecting at least some of the waveguides to provide stability to the waveguide assembly. The arrangement further comprises at least one antenna. The arrangement is formed in one piece by 3D printing.

According to an embodiment, the antenna comprises an array of multiple RF feed chains incorporating a heat exchanger. The antenna further comprises a housing containing said array and comprising at least one input and one output in fluid communication with the heat exchanger.

Another aspect of the invention relates to a method of designing and manufacturing the waveguide assembly arrangement as described above. In particular, the method includes the following steps:

- defining a footprint volume of the arrangement according to a predetermined footprint volume;
- modelling the arrangement by computer by defining
- the shape and length of each waveguide in the waveguide assembly
- the shape of the mechanical structure, and
- the shape of the fixation interfaces required to connect the waveguide assembly of the arrangement to electronic equipment and/or components within the constraints of the predetermined footprint, and
- manufacturing the arrangement in a single piece according to the model shape designed by computer with an additive manufacturing step.

According to an embodiment, the shape and length of each waveguide required for connection of the assembly of waveguides of the arrangement are further determined based on the number and type of electronic equipment and/or components to be integrated according to the constraints of a predetermined specification of a designer.

According to an embodiment, the shape and length of each waveguide required for the connection of the assembly of waveguides of the arrangement are further determined to optimize the performance of the satellite payload, and while respecting the mechanical and thermal constraints of the arrangement.

According to an embodiment, the shape of the mechanical structure as well as the shape of the heat transfer elements are determined, respecting the constraints of the predetermined footprint volume while optimizing the performance of the satellite payload, and respecting the mechanical and thermal constraints of the arrangement.

According to an embodiment, the method further comprises a step of connecting electronic equipment and/or components to the waveguide fixation interfaces.

According to an embodiment, the method further comprises a step of connecting photovoltaic cell panels to the mechanical structure of the arrangement.

BRIEF DESCRIPTION OF THE FIGURES

Examples of embodiments of the invention are indicated in the description illustrated by the appended figures in which.

EXAMPLES OF EMBODIMENTS OF THE INVENTION

In the present invention, the term "arrangement" can be interpreted as a complete structure that can be fixed in the payload bay of the communications satellite or a subassembly of the structure. In this case, the complete structure is obtained by assembling several subassemblies of the arrangement.

Figure 1:
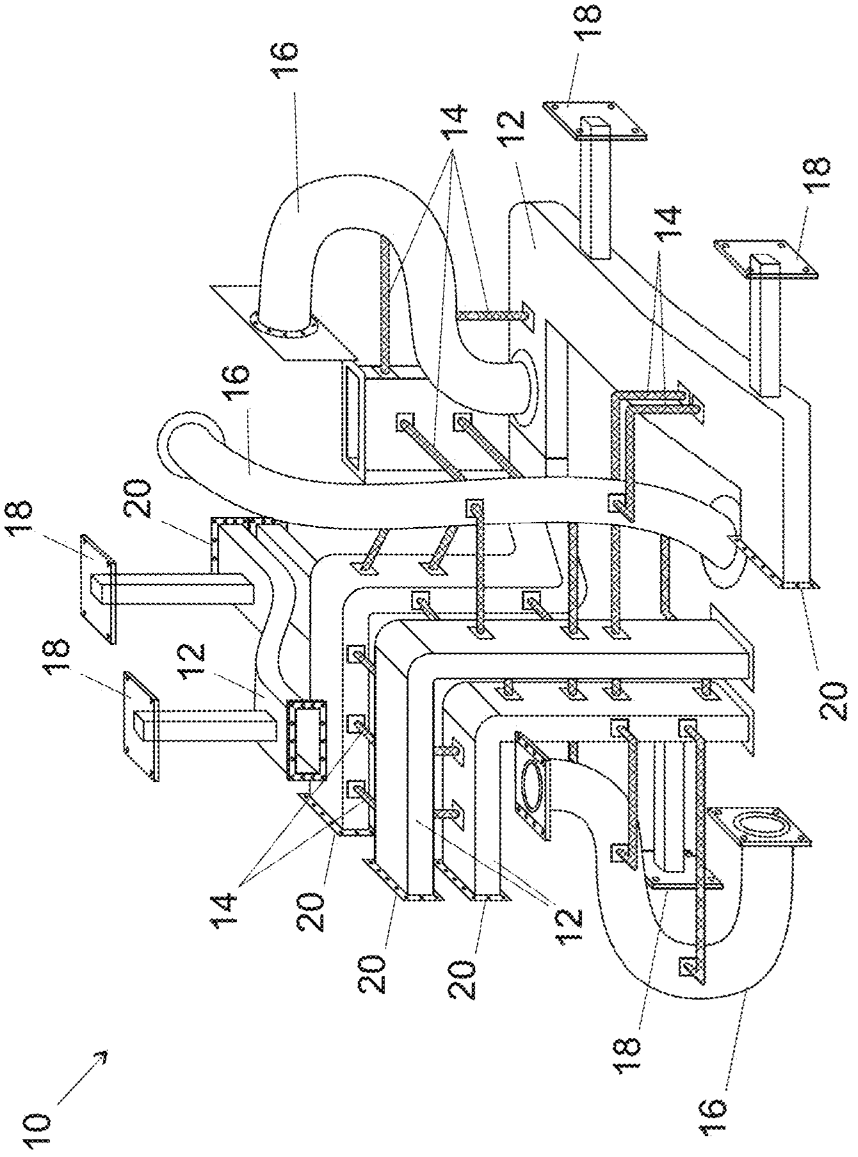
FIG. 1 represents a schematic view of an arrangement for telecommunication satellites, comprising notably an assembly of waveguides according to an embodiment of the invention.

According to a first embodiment illustrated in FIG. 1, the arrangement 10, for telecommunication satellites, comprises an assembly of waveguides 12 interconnected to each other by a mechanical structure in order to ensure a satisfactory rigidity/stability of the assembly of waveguides 12 according to a predetermined configuration.

This predetermined configuration is dictated not only as a function of a restricted footprint volume available in the payload bay of the telecommunications satellite, but also as a function of the number and type of electronic equipment and components to be integrated into the payload bay according to the constraints of a predetermined specification of a designer.

The mechanical structure may include a plurality of rigid links 14 interconnecting multiple waveguides 12 at different points along the length of the waveguides. These rigid links are, for example, in the form of rods made by 3D printing and arranged so as to connect two lateral surfaces together of at least two waveguides so that the arrangement 10 can withstand significant stresses, in particular during the takeoff of the rocket carrying the telecommunications satellite, while fulfilling the function of a damper against the vibrations generated, for example, during the rocket takeoff. The rods comprise each a core, for example made of polymer, and a metal jacket that provides rigidity.

The arrangement 10 may further comprise one or more heat dissipation elements, for example in the form of one or more cooling fins 16*a* and/or one or more heat transport tubes 16*b*, for example in the form of a heat pipe for transporting heat by means of the principle of heat transfer by phase transition of a fluid. The arrangement 10 may also include fixation elements, for example fixation stands 18, for fixing the arrangement 10 to the payload bay or to a support related to the payload bay of the communication satellite.

Each waveguide 12 according to FIG. 1 has a fixation interface 20 at both ends, preferably in the form of a fixation flange. According to the configuration of the arrangement 10, the waveguides 12 are arranged so that they can be connected, via their respective fixation flanges, to different electronic equipment and/or components.

Advantageously, the arrangement 10 is formed in a single piece made by additive manufacturing methods, for example 3D printing. In particular, additive manufacturing of waveguides comprising both non-conductive materials, such as polymers or ceramics, and conductive metals is known. Waveguides comprising ceramic or polymer walls manufactured by an additive method and then covered with a metal plating have notably been suggested. The use of a non-conductive core allows, on the one hand, to reduce the weight and cost of the arrangement 10 and, on the other hand, to implement 3D printing methods adapted to polymers or ceramics and allowing to produce high precision parts with low roughness.

WO 2017208153, the contents of which are incorporated by reference, discloses in particular a waveguide device for guiding a radio frequency signal at a specified frequency. The device includes a core fabricated by additive manufacturing and including sidewalls with inner surfaces defining a waveguide channel and a metallic conductive layer covering the inner surface of the core.

Additive manufacturing makes it possible to produce different configurations of the arrangement of waveguides 12, whose trajectory of each guide 12 is previously calculated and modeled by computer in order to optimize the footprint of the arrangement 10 by taking into account a particular specification of a designer. This process allows not only to obtain an optimal configuration of the arrangement 10 but also and especially a fast and easy manufacturing with a simplified assembly compared to conventional systems. Moreover, the realization of the arrangement in a single piece by an additive manufacturing step allows to print shapes impossible to assemble by conventional assembly processes.

Figure 2:
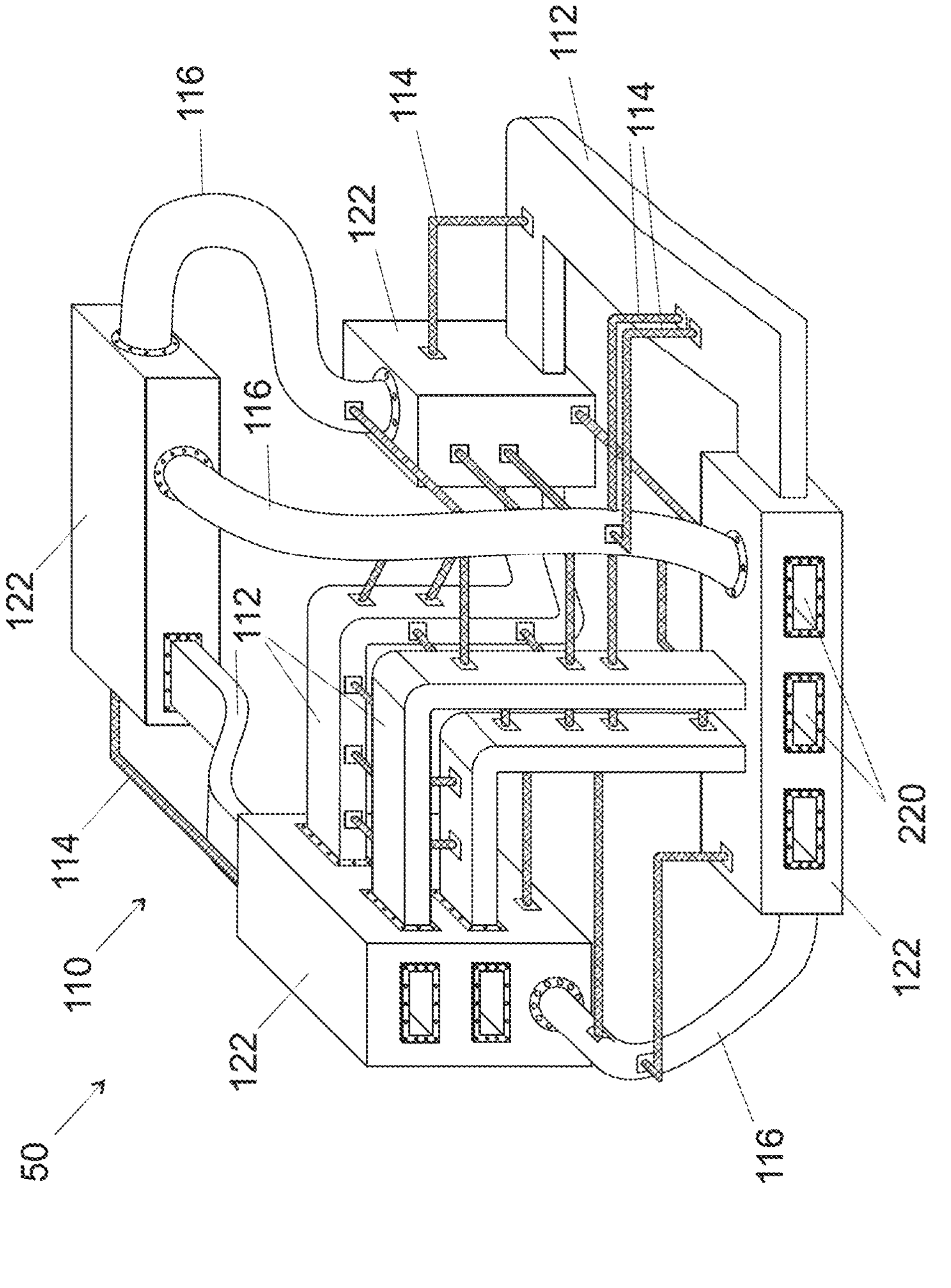
FIG. 2 represents a schematic view of an arrangement for telecommunication satellites, comprising an assembly of waveguides connected to electronic equipment and/or components according to another embodiment.

According to another embodiment illustrated in FIG. 2, the arrangement 110 is not intended to be mounted on a panel or stand. This arrangement 110 is connected only to electronic equipment and components 122 including one or more amplifiers, and to a computer processing unit to obtain an assembly 50 that can be connected to the payload bay (not shown), directly or indirectly.

Like the arrangement 10 according to the first embodiment, the arrangement 110 of FIG. 2 comprises an assembly of waveguides 112 interconnected to one another by a multitude of links in the form of rigid rods 114 interconnecting the waveguides 112 at different points along their respective lengths in order, on the one hand, to ensure satisfactory rigidity of the arrangement 110 and, on the other hand, to ensure that this arrangement 110 can withstand significant stress.

The arrangement 110 may further include one or more heat dissipation elements which may also be in the form of one or more cooling fins 116*a* and/or one or more heat transport tubes 116*b* (e.g., heat pipe). As in the first embodiment, each waveguide 112 includes an fixation interface 120 at both ends, preferably in the form of an fixation flange also integrally formed with the waveguide. The fixation flanges at the respective ends of the waveguides 112 may, for example, be connected respectively to two pieces of electronic equipment to transfer radio frequency signals from one piece of electronic equipment to the other.

Like the arrangement 10 according to the first embodiment, the arrangement 110 of FIG. 2 is made of a single piece obtained by an additive manufacturing process having the advantages mentioned above. The assembly 50 of FIG. 2 is obtained by an additional manufacturing step of connecting electronic equipment and/or components 122 to the fixation interfaces 120 of the waveguides 112.

Figure 3:
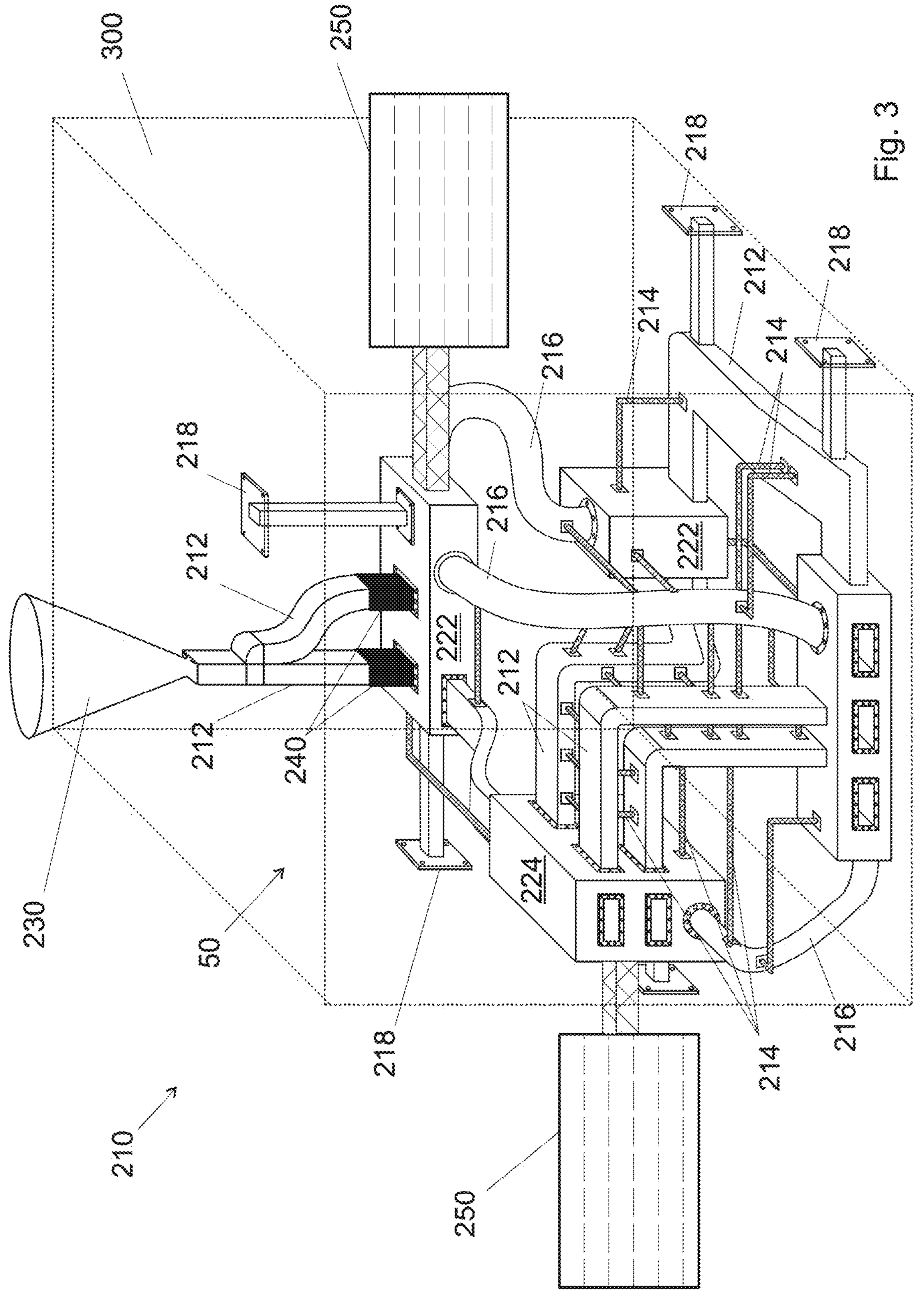
FIG. 3 shows a schematic view of an arrangement for telecommunication satellites arranged in the satellite payload bay, according to another embodiment.

According to another embodiment illustrated in FIG. 3, the arrangement 210 comprises an assembly of waveguides 212, a mechanical structure 214, one or more heat dissipation elements, e.g., one or more cooling fins 216*a* and/or one or more cooling tubes 216*b*, one or more filters 240 and at least one antenna 230. The filters 240 are, for example, connected to an amplifier 222 which is arranged to communicate with a computer processing unit 224. The amplifier 222 and the computer processing unit 224 are in contact with at least one heat dissipating element to dissipate heat generated by the amplifier and the computer unit. According to this configuration, a portion of the arrangement 210 may be disposed outside the payload bay 300.

Waveguides 212 connect the filters to the antenna 230. The mechanical structure 214 is configured to support the electronic equipment and components 222, 224, the antenna 230, and a plurality of photovoltaic cell panels 250.

Like the arrangement 10, 110 according to the first two embodiments, the arrangement 210 of FIG. 3 is in the form of a single piece made by an additive manufacturing process having the advantages discussed above. The assembly 50 of FIG. 3 is obtained by an additional manufacturing step of connecting electronic equipment and/or components 222, 224 to the assembly of waveguides 212, via the waveguide fixation flanges 220, and the photovoltaic cell panels 250 to the arrangement 210, in particular to the mechanical structure 214 of the arrangement.

Figure 4A:
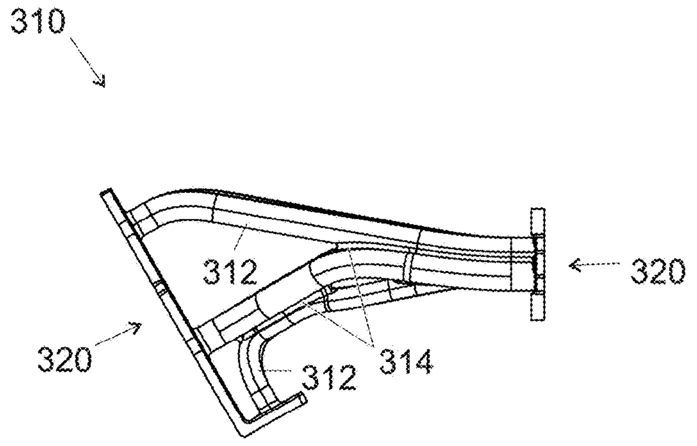
FIGS. 4*a*, 4*b*, 4*c* illustrate different perspective views of an arrangement for telecommunication satellites comprising several waveguides and a heat pipe, according to another embodiment.
Figure 4B:
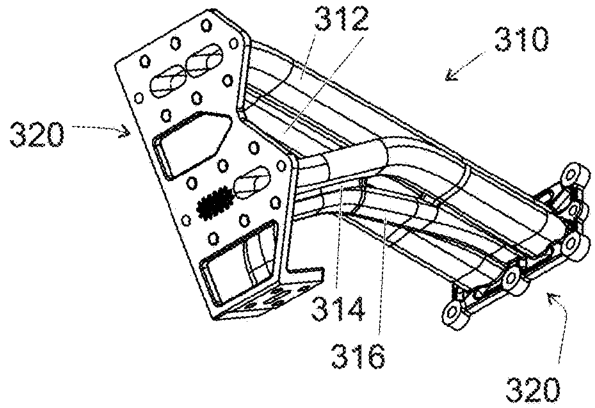
Figure 4C:
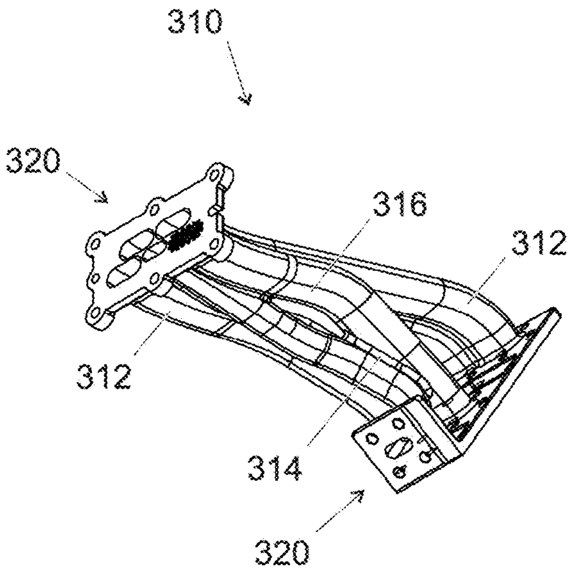
Figure 5A:
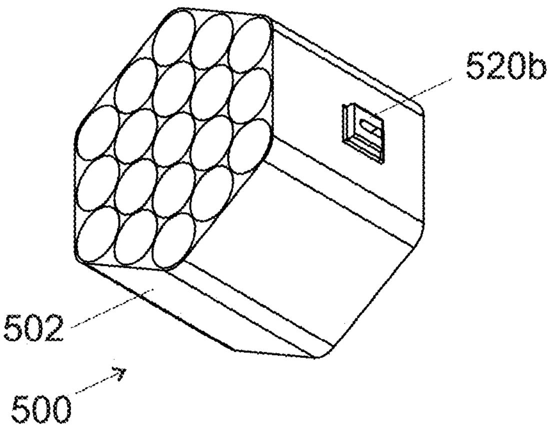
FIG. 5*a* illustrates a perspective view of a monolithic antenna according to an embodiment.
Figure 5B:
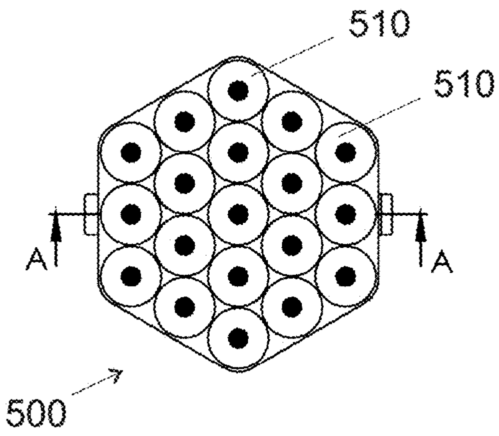
FIG. 5*b* illustrates a top view of FIG. 5*a;*
Figure 5C:
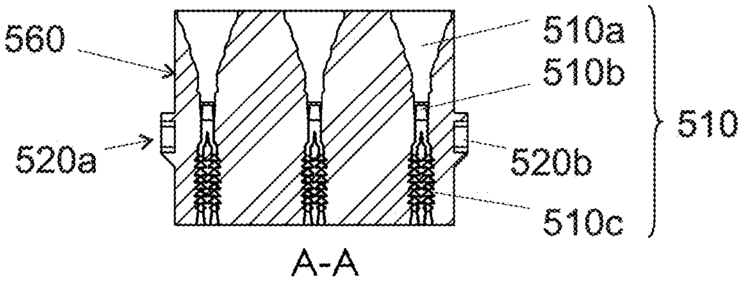
FIG. 5*c* illustrates a cross-sectional view of FIG. 5*b* along A-A.
Figure 5D:
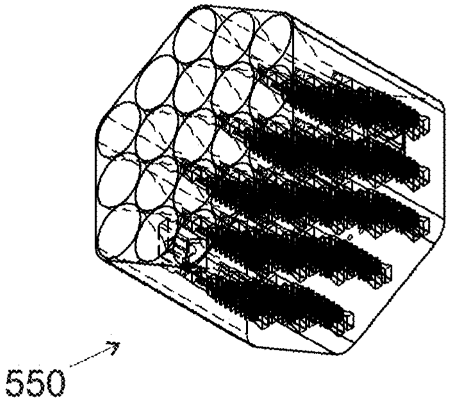
FIG. 5*d* illustrates a perspective view of the antenna of FIG. 5*a* without its housing.

According to another embodiment illustrated in FIGS. 4*a* to 4*c*, the arrangement 310 includes an assembly of waveguides 312 interconnected together by a mechanical structure 314 to rigidify the assembly of waveguides, and including fixation interfaces 320 to attach the waveguides 312 to, for example, RF components. This arrangement has the particularity of further comprising a heat pipe 316 in the form of a hermetic enclosure that contains a fluid in a liquid-vapor equilibrium state. The heat pipe 316 has grooves or fins along its inner surface to ensure the return of the fluid by capillary action. All of the aforementioned elements of the arrangement 310 is in one piece made by 3D printing.

The advantage of the heat pipe 316 is that it not only allows for the cooling of certain elements, for example the cooling of one or more waveguides 312 when they are located in a location in the payload bay of a communication satellite where a high temperature prevails, but also allows for the heating of one or more waveguides 312 or other elements when they are situated in a location inside the payload bay where a lower temperature prevails, or when these waveguides or other elements are situated outside the payload bay. Thus, the use of a heat pipe provides adequate temperature control of the waveguides or other elements for their optimal operation.

According to an embodiment, the arrangement formed in one piece by 3D printing comprises one or more monolithic antennas. The antenna may, for example, be of the type illustrated in FIGS. 5*a* to 5*d*. The antenna 500 includes a housing 502 containing an array 550 of a plurality of RF feed chains 510, for example 19 RF feed chains. Each chain 510 includes a horn 510*a*, a polarizer 510*b* and a filter 510.

The array 550 integrates a heat exchanger 560 which can have different structures to promote calorific exchanges, notably of the lattice, honeycomb or cellular type. To this end, the housing 502 includes one or more inlets 520*a* and one or more outlets 520*b* in fluid communication with the heat exchanger.

Figure 6:
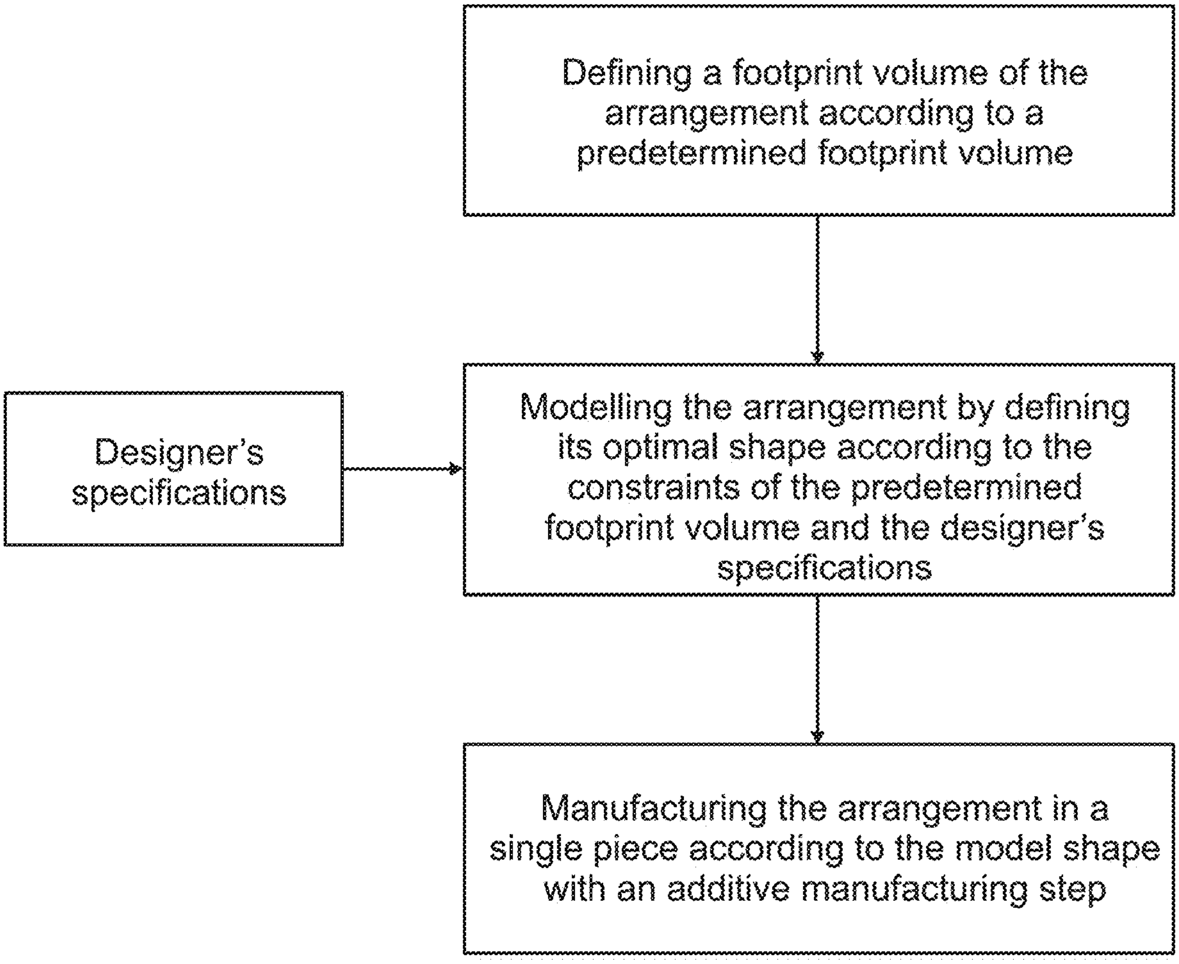
FIG. 6 illustrates a block diagram of a design and manufacturing process according to the different embodiments of the present invention.

The design and manufacturing process according to FIG. 6 can be adapted to any type of arrangement according to the invention. The arrangement may comprise, for example, a limited number of waveguides or, on the contrary, for complex systems, a large number of waveguides. For these complex systems, the modelling of the optimal waveguide trajectories is calculated by computer according to different parameters, in particular according to the number and type of equipment and/or electronic components that the waveguides must connect and the volume of space available for its installation in the payload bay of a telecommunications satellite. The optimal trajectories of the waveguides must also be modeled to optimize the performance of the satellite payload, while respecting the mechanical and thermal constraints of the arrangement.

What is claimed is:

1. Arrangement for satellites comprising a payload bay, the arrangement comprising an assembly of waveguides, waveguide fixation interfaces for fixing the waveguides to electronic equipment and/or components and a mechanical structure comprising a plurality of links interconnecting at least some of the waveguides to ensure the stability of the assembly of waveguides, wherein the arrangement further comprises at least one heat pipe which is arranged to heat or cool one or more of the waveguides, wherein the arrangement is formed in a single piece by 3D printing, and wherein each link of the plurality of links either connects the heat pipe to at least one waveguide or connects at least one waveguide to another of the waveguides.

2. Arrangement of claim 1, further comprising at least one antenna, the arrangement forming with the antenna on said single piece.

3. Arrangement of claim 2, wherein the antenna comprises an array of a plurality of RF feed chains incorporating a heat exchanger, the antenna further comprising a housing containing at least a portion of said array and comprising at least one input and one output in fluid communication with the heat exchanger.

4. Arrangement of claim 1, wherein the mechanical structure comprises the plurality of links interconnecting a side surface of at least two waveguides at different points.

5. Arrangement of claim 1, wherein the arrangement further comprises fixation elements for fixing the arrangement to the payload bay or to a support connected to the payload bay.

6. Arrangement of claim 1, wherein the arrangement further comprises one or more filters.

7. Assembly for satellites, comprising the arrangement of claim 1, and the electronic equipment and/or components connected to the waveguide fixation interfaces.

8. Assembly of claim 7, wherein one or more electronic equipment and/or components are selected from a group comprising the following elements: switch, circulator, isolator, low noise amplifier, power amplifier, computer signal processing unit, RF load, filter, multiplexer, MMIC circuit and RF circuit.

9. Assembly of claim 8, further comprising photovoltaic cell panels connected to the mechanical structure.

10. Method of designing and manufacturing the satellite arrangement of claim 1 comprising the following steps:

defining a footprint volume of the arrangement according to a predetermined footprint volume;

modelling the arrangement by computer by defining a shape and length of each waveguide of the waveguide assembly, a shape of the mechanical structure as well as the shape of the waveguide fixation interfaces necessary for the connection of the assembly of the waveguides of the arrangement to electronic equipment and/or components while respecting constraints of the predetermined footprint volume, and manufacturing the arrangement in a single piece according to a modelled shape with an additive manufacturing step.

11. Method of claim 10, wherein the shape and length of each waveguide required for connecting the assembly of waveguides of the arrangement, the shape of the mechanical structure as well as the shape of the waveguide fixation interfaces are further determined according to a number and type of electronic equipment and/or components to be integrated according to constraints of a predetermined specification.

12. Method of claim 10, wherein the shape and length of each waveguide required to connect the assembly of waveguides of the arrangement are further determined to optimize a performance of the satellite payload, and within mechanical and thermal constraints of the arrangement.

13. Method of claim 10, further comprising a step of connecting electronic equipment and/or components to the waveguide fixation interfaces.

14. Method of claim 10, further comprising a step of connecting photovoltaic cell panels to the mechanical structure of the arrangement.

15. Arrangement of claim 1, wherein the links are rods.

* * * * *